United States Patent [19]
Baversten et al.

[11] Patent Number: 5,386,443
[45] Date of Patent: Jan. 31, 1995

[54] SELF-EXPANDING WATERPROOF COVER FOR CRANE HOOK

[75] Inventors: Bengt I. Baversten, Wevatogue; Adrian P. Wivagg, Tolland, both of Conn.

[73] Assignee: Combustion Engineering, Inc., Windsor, Conn.

[21] Appl. No.: 172,821

[22] Filed: Dec. 27, 1993

[51] Int. Cl.⁶ .............................................. G21C 19/00
[52] U.S. Cl. ...................... 376/260; 376/203; 376/292; 212/221; 294/131
[58] Field of Search ............... 376/203, 260, 262, 264, 376/271, 287, 292; 212/220, 221, 266; 294/82.1, 131, 906; 220/216, 218, 221, 222; 414/146

[56] References Cited
U.S. PATENT DOCUMENTS

| | | | |
|---|---|---|---|
| 3,917,953 | 11/1975 | Wodrich | 376/272 |
| 5,133,466 | 7/1992 | Baversten | 212/221 |
| 5,170,899 | 12/1992 | Baversten | 376/260 |

*Primary Examiner*—Daniel D. Wasil
*Attorney, Agent, or Firm*—Ronald P. Kananen; John H. Mulholland

[57] ABSTRACT

In order to provide a relatively inexpensive water-tight telescopic enclosure which can extend automatically upon demand, a tubular extension piece is reciprocally mounted on a container-like hook box structure. A tube seal which interconnects the hook box and the tubular extension provides a watertight connection between the two members and also provides an air space in a folded portion in which air can collect and produce buoyancy as the hook box is lowered into water. The tubular extension also has a larger cross-sectional area than the hook box and thus produces additional buoyancy. When the hook box is lowered into water the extension piece automatically floats upwardly to prevent the intrusion of water into the interior of the hook box and thus prevent contamination of pieces of apparatus enclosed therein.

6 Claims, 3 Drawing Sheets

SELF-EXPANDING WATERPROOF COVER FOR CRANE HOOK

BACKGROUND OF THE INVENTION

1. Field of the Invention

The present invention relates generally to cranes for use in environments such as encountered in a boiling water nuclear reactor (BWR). More specifically, the present invention relates to a water proof cover arrangement for a heavy-duty overhead crane which prevents crane components from becoming radioactively contaminated when lowered into the water which fills the reactor pressure vessel and surrounding reactor cavity.

2. Description of the Relevant Art

Movement of large pieces of equipment and components of a boiling water reactor is accomplished by flooding the reactor cavity and pressure vessel in a manner wherein radioactive emissions are suppressed and it is possible to remove the reactor head and perform routine maintenance, refuelling and the like. These procedures however, require that large pieces of equipment, such as a steam seperator, be lifted out of the reactor pressure vessel and transferred to pools which are provided adjacent to the vessel and that form part of the reactor cavity. To achieve this transfer, it is necessary to use a heavy-duty overhead crane which comprises a part of the reactor system and which is mounted above the reactor cavity. Due to the limited space available within the reactor pressure vessel and the geometry of the pool of the reactor cavity within which the loads are temporarily stored, it is sometimes necessary to lower the crane hook below the surface of the water. Because the water is radioactive, it is undesirable for the crane hook, hook block or cables which support the hook block, to come into direct contact with the water, as such contact causes contamination and demands that these pieces of apparatus be thoroughly washed or otherwise suitably decontaminated after use.

U.S. Pat. No. 5,170,899 issued on Dec. 15, 1992 in the name of Baversten (one of the two inventors named on this application), discloses an arrangement wherein a telescopic cover arrangement is provided on the hook box connected to the load to be lifted by the crane. The telescopic arrangement is arranged to be extendible when the hook is lowered below the surface of the water in a manner which encloses the hook, hook block and the lower portions of the suspending cables and provides an air space thereabout. However, in order for this telescopic arrangement to be effective, a watertight interface must be provided between the two moving elements. Further, in order achieve extension and contraction of the arrangement a remotely controlled servo which is either hydraulic or pneumatically operated, is required. This construction, however, requires both a precise seal and the provision of the remotely controlled hydraulic or pneumatic servo. The construction is thus relatively complex and expensive.

SUMMARY OF THE INVENTION

It is, therefore, a primary object of the present invention to provide a watertight cover for apparatus such as a crane hook, hook block and cables, which does not interfere with the crane operation and which is both relatively simple and inexpensive.

It is a further object of the present invention to provide a watertight cover arrangement which extends and deploys automatically in response to immersion in water and which obviates a need for a remotely controlled servo device for such purposes.

In brief, the above objects are achieved by an arrangement wherein a tubular extension piece is reciprocally mounted on a container-like hook box or the like type of structure. A tube seal which interconnects the hook box and the tubular extension provides a watertight connection between the two members and also provides an air space in a folded portion, in which air can collect and produce buoyancy as the hook box is lowered into water. The tubular extension also has a larger cross-sectional area than the hook box and thus produces additional buoyancy. When the hook box is lowered into water the extension piece automatically floats upwardly to prevent the intrusion of water into the interior of the hook box and thus prevents the contamination of various pieces of apparatus enclosed therein.

More specifically, a first aspect of the present invention resides in an enclosure for a hook and hook block used to lift loads, which features: a hook box which has a cylindrical wall portion that extends up around the hook and hook block; an essentially tubular extension piece reciprocally disposed about the cylindrical wall portion, the extension piece having a diameter which is larger than the diameter of the cylindrical wall portion; and a tube seal which is disposed between extension piece and the cylindrical wall portion and which is effective to interconnect the extension piece and the cylindrical wall portion in a manner which produces a watertight seal therebetween. The tube seal defines a space in which air can collect. This air, in combination with a difference in diameter between the cylindrical wall portion and the extension piece, produces a buoyancy which biases the extension piece upwardly with respect to the cylindrical wall portion when the hook box is immersed in water and thus extends the enclosure in a manner which prevents water from entering the hook box and contacting the hook or hook block.

A second aspect of the present invention resides in a nuclear reactor system which features: a reactor pressure vessel disposed in a reactor cavity, the reactor cavity including a separator pool which is separated from the reactor pressure vessel by a separator pool threshold; an overhead crane which is disposed above the reactor cavity and arranged to lift and transport a device that is normally disposed in the reactor pressure vessel, from the reactor pressure vessel to the separator pool while the reactor cavity is filled to a predetermined depth with water. In this system the overhead crane includes: a hook block which is suspended from the crane by cables; a hook operatively connected with the hook block and engageable with the device; a water-tight hook box, the hook box having a tubular portion which extends upwardly and which encloses the hook, the hook block and a portion of the cables; an essentially tubular extension piece reciprocally disposed about the tubular portion, the extension piece having a diameter which is larger than the diameter of the tubular portion; and a tube seal disposed between the extension piece and the tubular portion and effective to interconnect the extension piece and the tubular portion in a manner which produces a watertight seal therebetween, the tube seal being folded in a manner which defines a space in which air can collect. The collected air in combination with a difference in diameter between the cylindrical wall portion and the extension piece, produces a buoyancy which biases the extension piece upwardly with respect to the cylindrical wall portion when the hook box is immersed in the water and which extends the enclosure to prevent water from entering the hook box and contacting the hook or hook block.

A third aspect of the invention resides in an enclosure for a device comprising: a container-like structure which encloses the device; a rigid extension member which is reciprocally disposed on the container-like structure so as to be relatively movable with respect thereto; seal means for sealingly interconnecting the container-like structure and the extension member and producing a water-tight seal; and floatation means for causing the extension member to move upwardly from the container-like structure when the container-like structure is immersed in water in a manner which is effective for preventing water from entering the container-like structure.

BRIEF DESCRIPTION OF THE DRAWINGS

The present invention will become more clearly appreciated as a description of the preferred embodiment is made with reference to the appended drawings in which.

DESCRIPTION OF THE PREFERRED EMBODIMENT

Figure 1:
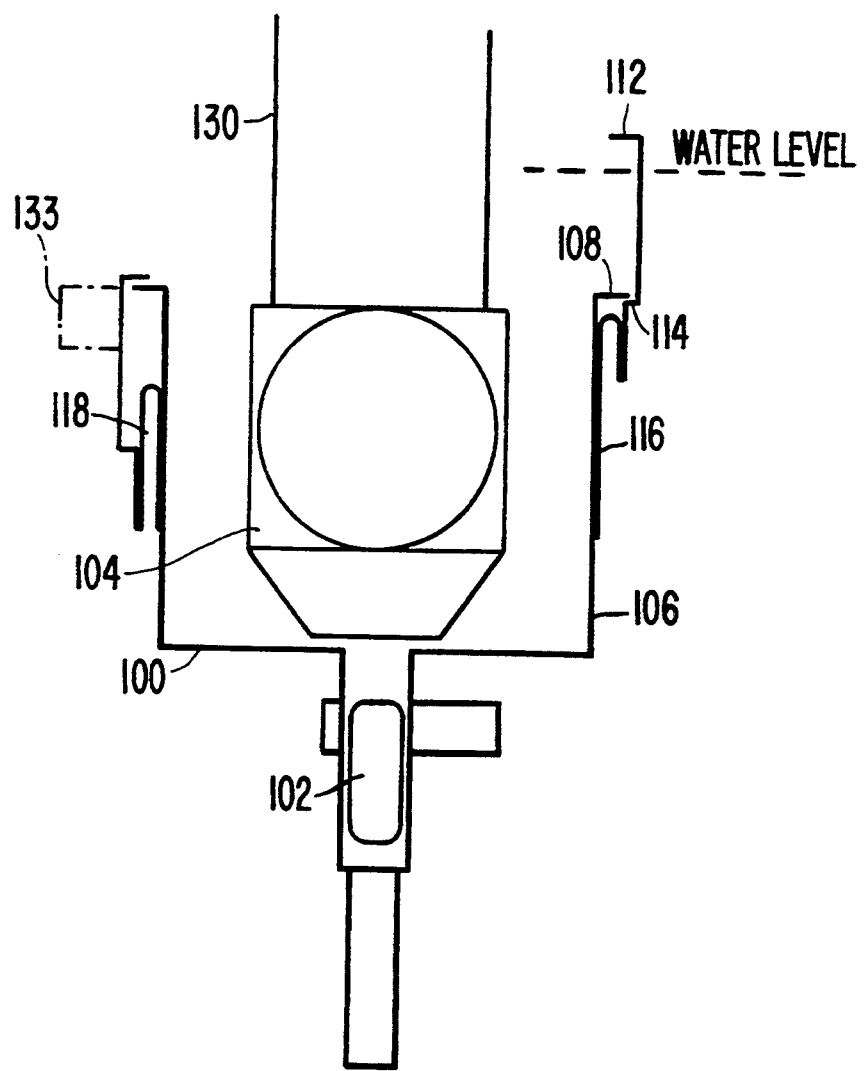
FIG. 1 is a front sectional view showing an extendible enclosure and the provision of a tubular type seal between telescopically arranged extension members thereof.

FIG. 1 illustrates an enclosure according to a first embodiment of the invention. This arrangement uses a water-tight hook box 100 to enclose the crane hook 102 and hook block 104. As will be appreciated from this figure, in this particular embodiment, the hook box has a cylindrical wall portion 106 which extends up to a level which is slightly above the top of the hook block. A radially outwardly extending flange 108 is provided at the upper edge of the cylindrical wall portion 106. A cylindrical extension piece 110 is provided about the cylindrical wall portion. A radially inward extending flange 112 is formed at the upper edge of the extension piece and is arranged to seat on the radially outwardly extending flange of the wall portion when the arrangement is in a fully contracted state. The extension piece 110 is further formed with a shoulder portion 114 which is arranged to engage the lower edge of the outwardly extending flange 108 when the enclosure assumes a fully extending state. A tubular seal 116 (or rolling sock seal as such arrangements are sometimes referred to), interconnects the two telescopically arranged portions of the enclosure. More specifically, the tubular seal 116 has one end portion connected to the lower inner surface of the extension piece 110 and a second end connected to the outer wall of the cylindrical wall portion 106 of the hook box 100. When the enclosure is fully contracted, the tubular seal 116 assumes the condition illustrated on the left-hand half of FIG. 1 while when it assumes a fully extended state the seal assumes the configuration illustrated on the right-hand half of the figure.

In accordance with the present invention, the annular space 118 which is defined within a folded portion of the tubular seal 116, encloses sufficient air to produce, in combination with the different in diameters (or cross-sectional areas) between the movable extension piece 110 and the cylindrical wall portion 106 of the hook box 100, sufficient buoyancy to lift the extension piece upwardly as the enclosure is lowered into water and thus induce a floatation or biasing effect which automatically extends the telescopic enclosure as it is immersed. The weight of the extension piece 110 of course automatically induces the arrangement to contract or collapse, when it is lifted out of the water.

The hook box 100, the lower portion of which is of a size to receive the crane hook 102, is detachably secured to the hook by two parallel, transversely disposed pins 120. The hook box 100 is engageable with a load 122 to be handled by a crane 128. For purposes of illustration, the hook box 100 is shown in association with a conventional strongback 124, which may be integrally formed with the hook box 100 if so desired.

Figure 3:
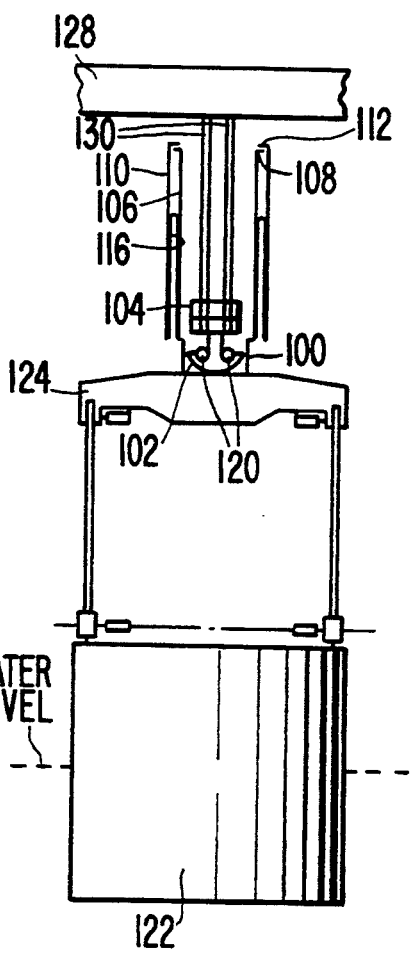
FIGS. 2, 3 and 4 are schematic views which show the invention applied to a hook box and which illustrate how the enclosure expands in response to immersion in water during given operations involved in lifting a load out of the reactor pressure vessel and moving it into an adjacent holding pool.
Figure 2:
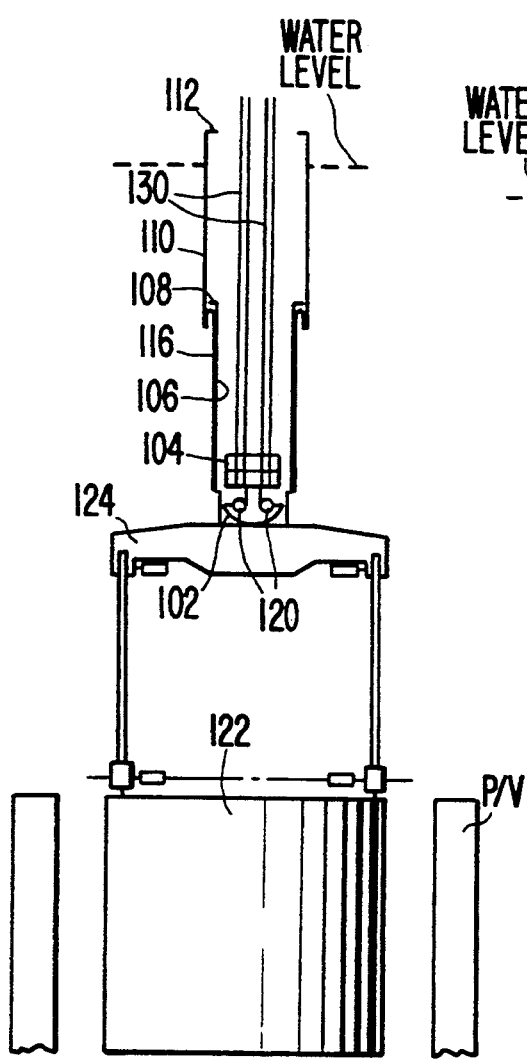
Figure 4:
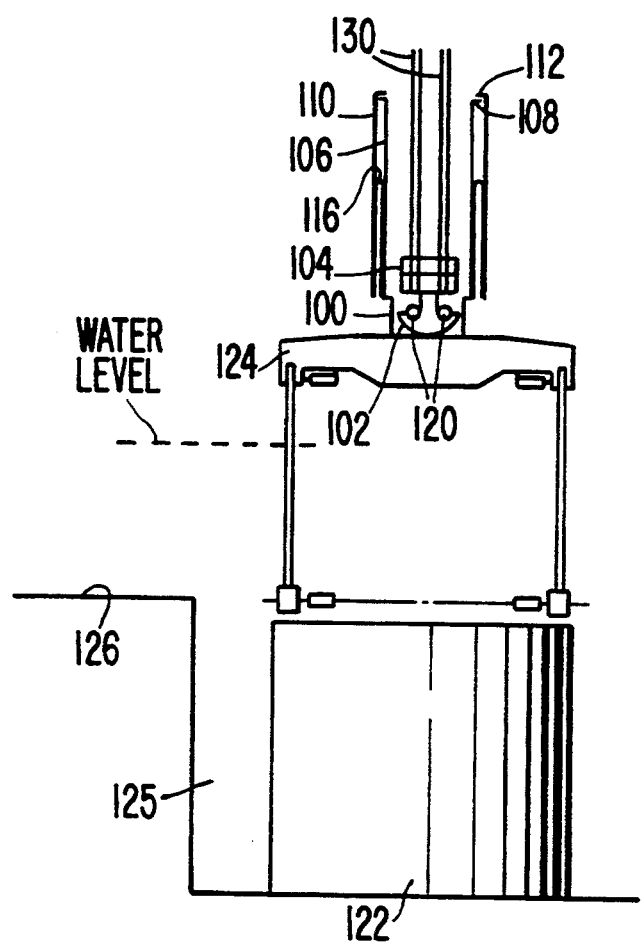

In FIGS. 2 to 4, the watertight enclosure is shown in use within the reactor cavity of a boiling water reactor (BWR). In this instance the apparatus (load 122) which is being removed from the pressure vessel P/V and moved to a separator pool is, merely by way of example, a steam separator. As will be appreciated from these figures, it is necessary to lift the steam separator 122 up out of the pressure vessel P/V, carry it over the separator pool threshold 126 and then lower it into the separator pool 125 until it rests on the pool floor.

It will be appreciated that this problem is complicated by the comparatively low maximum travel height of the overhead crane 128 and the desire to avoid wetting the crane hook 102, hook block 104 and cables 130 with contaminating radioactive water.

With the provision of the tubular extension piece 110 and the tubular seal 116 as the hook box 100 is lowered into the water the buoyancy of the arrangement induces sufficient lift to induce the extension piece 110 so move upwardly with respect to the hook box 100 and assume the condition illustrated in FIG. 2.

As will be appreciated, with the enclosure extended in this manner, the radioactive water is prevented from contacting the hook 102, hook block 104 and the portion of the suspension cables 130 which are below water level, hence preventing contamination of these components.

After the appropriate connection is established and the steam separator 122 is lifted up out of the pressure vessel P/V and raised to a level wherein it can be carried over a separator pool threshold 126 (such as illustrated in FIG. 3), the enclosure retracts under the influence of gravity assumes a non-extended or contracted condition such as illustrated in FIGS. 3 and 4.

When the steam separator 122 is lowered into the separator pool 125 and comes to rest on the floor of the pool (see FIG. 4), the hook box 100 is still above the level of the water in the reactor cavity and the bellows arrangement remains in its non-extended state.

When it is time to return the steam separator 122 to the pressure vessel P/V, the device is lifted up out of the separator pool 125, moved over the separator pool threshold 126 and lowered back down into its operative position in the reactor pressure vessel P/V. As the hook 102 and hook box 100 are lowered sufficiently below the level of the water, the extension piece 110 floats up and prevents any contaminating contact between the water and the hook and associated pieces of apparatus.

It is within the scope of the present invention to provide an additional buoyant member or float 133 on the extension piece in the manner illustrated in phantom on the left hand side of FIG. 1.

Although the invention has been described by reference to only a single embodiment, it is to be understood that various changes and modifications may be effected without departing from the scope of the invention which is intended to be limited only the appended claims.

What is claimed is

1. An enclosure for a hook and hook block used to lift loads, comprising:
    a hook box, said hook box having a cylindrical wall portion which extends up around the hook and hook block;
    an essentially tubular extension piece reciprocally disposed about said cylindrical wall portion, said extension piece having a diameter which is larger than the diameter of said cylindrical wall portion; and
    a tube seal disposed between extension piece and said cylindrical wall portion and effective to interconnect said extension piece and said cylindrical wall portion in a manner which produces a watertight seal therebetween, said tube seal defining a space in which air can collect, the air in combination with a difference in diameter between said cylindrical wall portion and said extension piece, producing a buoyancy which biases said extension piece upwardly with respect to said cylindrical wall portion when said hook box is immersed in water and which extends said enclosure and prevents water from entering said hook box and contacting said hook or hook block.

2. An enclosure as set forth in claim 1, further comprising a buoyant member which is connected to said extension piece.

3. A nuclear reactor system comprising:
    a reactor pressure vessel disposed in a reactor cavity, said reactor cavity including a separator pool which is separated from said reactor pressure vessel by a separator pool threshold;
    an overhead crane disposed above said reactor cavity and arranged to lift and transport a device which is normally disposed in said reactor pressure vessel, from said reactor pressure vessel to said separator pool while said reactor cavity is filled to a predetermined depth with water, said overhead crane including:
    a hook block which is suspended from said crane by cables;
    a hook operatively connected with said hook block and engageable with said device;
    a hook box, said hook box having a tubular portion which extends upwardly and which encloses said hook, said hook block and a portion of said cables;
    an essentially tubular extension piece reciprocally disposed about said tubular portion, said extension piece having a diameter which is larger than the diameter of said tubular portion; and
    a tube seal disposed between said extension piece and said tubular portion and effective to interconnect said extension piece and said tubular portion in a manner which produces a watertight seal therebetween, said tube seal being folded in a manner which defines a space in which air can collect, the collected air in combination with a difference in diameter between said cylindrical wall portion and said extension piece, producing a buoyancy which biases said extension piece upwardly with respect to said cylindrical wall portion when said hook box is immersed in the water and which extends said enclosure and prevents water from entering said hook box and contacting said hook or hook block.

4. An enclosure for a device comprising:
    a container-like structure which encloses said device;
    a rigid extension member which is reciprocally disposed on said container-like structure so as to be relatively movable with respect thereto;
    seal means for sealingly interconnecting said container-like structure and said extension member and for producing a water-tight seal; and
    floatation means for causing said extension member to move upwardly from said container-like structure when said container-like structure is immersed in water in a manner which is effective for preventing water from entering said container-like structure.

5. An enclosure as set forth in claim 4, wherein said seal means comprises a tube seal and wherein said floatation means comprises a space which is defined by said tube seal and in which air can collect.

6. An enclosure as set forth in claim 4, wherein said extension member has a larger cross-sectional area than said container-like structure, and wherein a difference in cross-sectional area produces buoyancy and forms part of said floatation means.

* * * * *